(12) United States Patent
Elsey et al.

(10) Patent No.: US 11,169,575 B2
(45) Date of Patent: Nov. 9, 2021

(54) RETRACTABLE FEET FOR COMPUTING DEVICES

(71) Applicant: HEWLETT-PACKARD DEVELOPMENT COMPANY, L.P., Spring, TX (US)

(72) Inventors: Andrew Elsey, Spring, TX (US); Tony Moon, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/650,657

(22) PCT Filed: Sep. 27, 2017

(86) PCT No.: PCT/US2017/053641
§ 371 (c)(1),
(2) Date: Mar. 25, 2020

(87) PCT Pub. No.: WO2019/066795
PCT Pub. Date: Apr. 4, 2019

(65) Prior Publication Data
US 2020/0319670 A1 Oct. 8, 2020

(51) Int. Cl.
*G06F 1/16* (2006.01)
(52) U.S. Cl.
CPC ............ *G06F 1/166* (2013.01); *G06F 1/1681* (2013.01)
(58) Field of Classification Search
CPC combination set(s) only.
See application file for complete search history.

(56) References Cited

U.S. PATENT DOCUMENTS

| 5,594,220 | A | 1/1997 | Hackbarth | |
|---|---|---|---|---|
| 6,053,589 | A | 4/2000 | Lin | |
| 6,097,595 | A * | 8/2000 | Cipolla | G06F 1/1616 248/685 |
| 6,771,494 | B2 | 8/2004 | Shimano | |
| 7,813,122 | B2 | 10/2010 | Wang et al. | |
| 8,520,382 | B2 | 8/2013 | Tye et al. | |
| 8,879,251 | B2 * | 11/2014 | Hsiu | G06F 1/166 361/679.59 |
| 9,128,664 | B1 * | 9/2015 | Tabone | G06F 1/1681 |
| 9,253,903 | B2 | 2/2016 | Kawada et al. | |
| 9,354,669 | B2 * | 5/2016 | Chen | G06F 1/1681 |
| 9,983,636 | B2 * | 5/2018 | Ho | E05F 1/00 |
| 9,983,638 | B2 * | 5/2018 | Chen | G06F 1/1681 |
| 10,503,214 | B2 * | 12/2019 | Jiang | G06F 1/1681 |
| 10,809,770 | B2 * | 10/2020 | Huang | G06F 1/16 |

(Continued)

OTHER PUBLICATIONS

Two Screens, Four Modes, One Odd Ultrabook: the Asus Taichi 21 Review, Feb. 15, 2013, https://arstechnica.com/gadgets/2013/02/two-screens-four-modes-one-odd-ultrabook-the-asus-taichi-21-review/.

*Primary Examiner* — Lisa Lea-Edmonds
(74) *Attorney, Agent, or Firm* — HP Inc. Patent Department

(57) ABSTRACT

Examples disclosed herein provide a computing device. One example computing device includes a display member and a base member rotatably connected to each other via a hinge. The computing device includes a retractable foot to extend from a bottom surface of the base member when the display member is to be rotated open from a closed position to a first operating position.

13 Claims, 4 Drawing Sheets

(56) References Cited

U.S. PATENT DOCUMENTS

| | | | |
|---|---|---|---|
| 2009/0147469 A1* | 6/2009 | Chen | G06F 1/183 |
| | | | 361/679.55 |
| 2010/0315773 A1* | 12/2010 | Senatori | H05K 5/0234 |
| | | | 361/679.55 |
| 2013/0016460 A1* | 1/2013 | Yeh | G06F 1/1675 |
| | | | 361/679.01 |
| 2015/0016057 A1* | 1/2015 | Fu | G06F 1/203 |
| | | | 361/679.55 |
| 2015/0062793 A1 | 3/2015 | Chen | |
| 2016/0041589 A1 | 2/2016 | Tazbaz et al. | |
| 2019/0212773 A1* | 7/2019 | Jiang | G06F 1/1681 |
| 2020/0026324 A1* | 1/2020 | Huang | F16M 13/005 |

\* cited by examiner

RETRACTABLE FEET FOR COMPUTING DEVICES

BACKGROUND

The emergence and popularity of mobile computing has made portable computing devices, due to their compact design and light weight, a staple in today's marketplace. Within the mobile computing realm, notebook computers, or laptops, are one of the most widely used devices and generally employ a clamshell-type design consisting of two members connected together at a common end via hinges, for example. In most cases, a first or display member is utilized to provide a viewable display to a user while a second or base member includes an area for user input (e.g., touchpad and keyboard). In addition, the viewable display may be a touchscreen (e.g., touchscreen laptop), allowing the user to interact directly with what is displayed by touching the screen with simple or multi-touch gestures.

DETAILED DESCRIPTION

Notebook computers may include a feature that allows the device to be "converted" from one style of use to at least another style of use. For example, a notebook computer may be converted from a laptop operating position, where the touchpad and keyboard are used as input components, to a tablet operating position, where the viewable display is used for both viewing and input. Such devices that serve this dual purpose may be called convertible laptops. Many form factors exist for convertible laptops. As an example of a convertible laptop, the hinges coupling the base and display members may allow the display member to flip 360 degrees when transitioning from laptop mode to tablet mode. As a result of flipping over the display member by 360 degrees, the display member and base member may be collapsed against each other in an open, folded position. As an example, in this open, folded position, a bottom surface of the base member may be covered by a back surface of the display member.

Examples disclosed herein provide a mechanism for computing devices, such as the notebook computer described above with the 360 degree hinge, which provides an angled support, for example, when it is being operated in an operating position, such as laptop mode. The angled support allows for increased airflow below the computing device, which allows for better thermal performance. As a result, the improved thermal performance keeps the computing device cool, and cooler devices have the potential to have higher performance. In addition to the increased airflow, the mechanism provides an angled typing surface while the computing device is being used in an operating position such as laptop mode, creating a more ergonomic keyboard experience, as angling the typing surface may provide a more natural position for the user. As will be further described, the mechanism may correspond to a retractable foot that extends from a bottom surface of the base member of the computing device when it is being used in an operating position such as laptop mode, and then automatically retracts back into the bottom surface of the base member when the computing device is transitioned to another operating position, such as tablet mode.

Figure 1A:
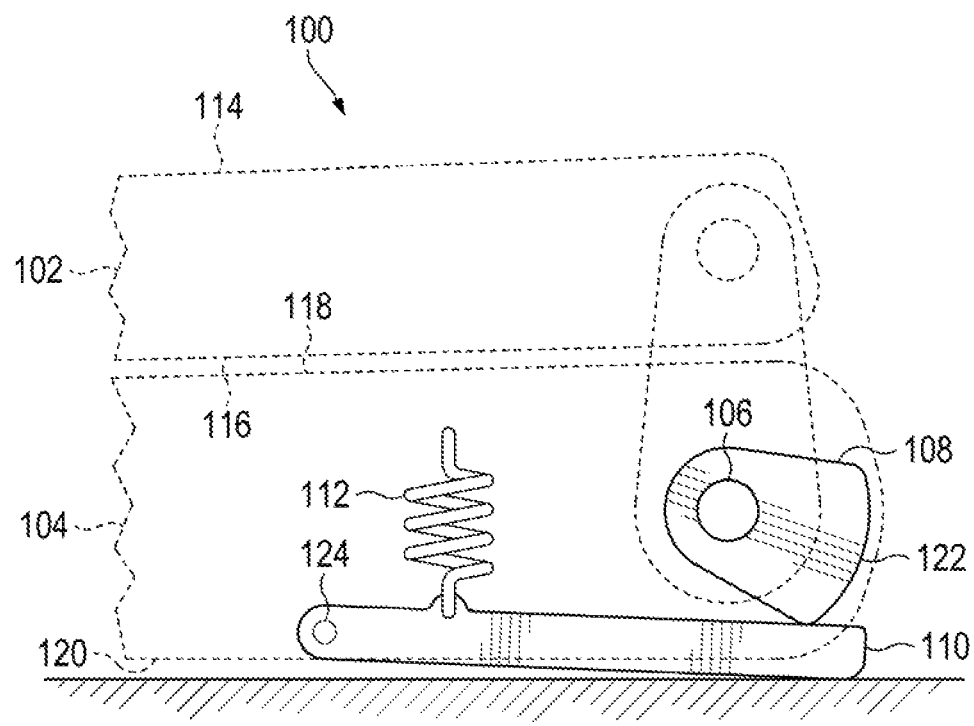
FIGS. 1A-B illustrate a computing device including a retractable foot that extends to provide angled support when the computing device is used in certain operating positions, as an example.
Figure 1B:
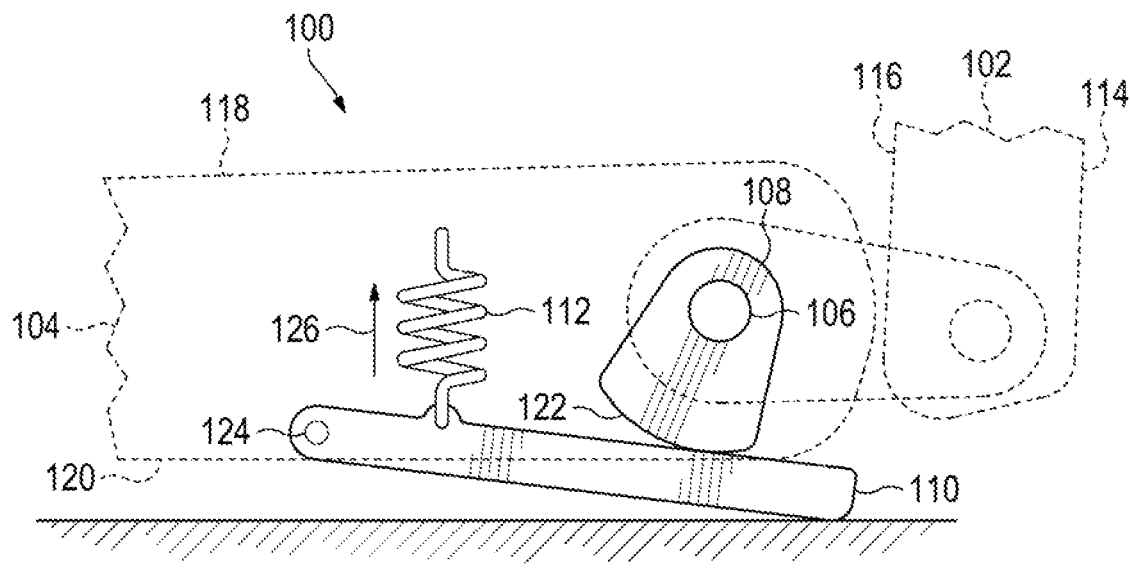

With reference to the figures, FIGS. 1A-B illustrate a computing device 100 including a retractable foot 110 that extends to provide angled support when the computing device 100 is used in certain operating positions, such as laptop mode, as an example. The computing device 100 includes a first member (base member 104) and a second member (display member 102) that are rotatably connected to each other. As described above, the hinges coupling the base member 104 and display member 102 to each other may allow for display member 102 to flip 360 degrees when transitioning from laptop mode to tablet mode. The base member 104 includes a top surface 118 that may include input means for operation by a user, such as a keyboard and/or a touchpad, and a bottom surface 120 opposite the top surface 118. The display member 102 includes a display surface 116 and a back surface 114 opposite the display surface 116. As an example, the display surface 116 may be used for viewing the video output of the laptop 100, and include input means for operation by a user, such as a touchscreen.

As an example, the retractable foot 110 is mechanically linked to the hinge of the computing device 100. For example, as the display member 102 is rotated open from the closed position illustrated in FIG. 1A to a first operating position illustrated in FIG. 1B, the retractable foot 110 extends from the bottom surface 120 of the base member 104. As illustrated, the first operating position may correspond to laptop mode, where the display member 102 is opened to an appropriate angle for a user and where the touchpad and keyboard on the top surface 118 of the base member 104 may be used as input components. By extending from the bottom surface 120 of the base member 104, the retractable foot 110 provides an angled support to the base member 104, increasing airflow below the computing device 100 to allow for better thermal performance, and providing an angled typing surface while the computing device 100 is being used in an operating position such as laptop mode, as described above. Similarly, when the display member 102 is returned to the closed position illustrated in FIG. 1A, the retractable foot 110 retracts back into the bottom surface 120 of the base member 104. As will be further described, when the computing device 100 is used in other operating positions, such as tablet mode, the retractable foot 100 may also retract back into the bottom surface 120 of the base member 104, in order for the back surface 114 of the display member 102 to be flush against the bottom surface 120 of the base member 104. The number of retractable feet used may vary from what is illustrated.

As an example of mechanically linking the hinge of the computing device 100 and the retractable foot 110, the computing device 100 includes a cam 108 that shares an axis 106 with the hinge of the computing device 100. By sharing the same axis 106, rotation of the cam 108 may be coupled to the rotation of the display member 102 around the base member 104, as the computing device 100 is transitioned between the closed position and various operating positions. As will be further described, as the computing device 100 is transitioned between the closed position and various operating positions, the rotation of the cam 108 controls extension and retraction of the retractable foot 110.

As an example, a geometry of the cam 108 determines when the retractable foot 110 extends and retracts, as the display member 102 rotates around the base member 104. For example, referring to FIG. 1A, when the curved portion 122 of the cam 108 is not in contact with the retractable foot 110, the retractable foot 110 remains retracted while the computing device 100 is in a closed position. However, referring to FIG. 1B, when the display member 102 is rotated open to laptop mode, the curved portion 122 of the cam 108 makes contact with the retractable foot 110 and extends it out from the bottom surface 120 of the base member 104. As an example, the retractable foot 110 pivots in and out from the bottom surface 120 of the base member 104 from an end 124 of the retractable foot 110. As a result, as the curved portion 122 of the cam 108 makes contact with the retractable foot 110, the retractable foot 110 pivots out from the end 124, to provide angled support for the computing device 100. The geometry of the cam 108 may vary, and is not limited the curved portion 122 illustrated.

As an example, the computing device 100 includes a mechanism for the retractable foot 110 to maintain contact with the cam 108, in order for the retractable foot 110 to extend and retract, based upon the rotation of the cam 108. For example, the mechanism includes a spring 112 coupled to the retractable foot 110 and within the base member 104, to draw the retractable foot towards the computing device 100 and towards the cam 108. By the spring 112 ensuring contact with cam 108, the desired motion of the retractable foot 110, for example, its extension and retraction, may be achieved while the computing device 100 is operated in one of its operating positions. For example, referring to FIG. 1A, the force provided by the spring 112 keeps the retractable foot 110 retracted into the bottom surface 120 of the base member 104. Similarly, as the computing device 100 is operated in laptop mode, as illustrated in FIG. 1B, there is a tension created on the spring 112 (indicated by arrow 126) as the curved portion 122 of the cam 108 engages the retractable foot 110 to extend from the bottom surface 120. The tension will cause the retractable foot 110 to retract when the curved portion 122 of the cam 108 no longer engages the retractable foot 110, for example, when the computing device 100 is back in a closed position or another operating position, such as tablet mode. The spring 112 may be, for example, a compression spring, a torsion spring, etc. The computing device 100 may include multiple springs or a single spring for stowing away the retractable foot 110.

Figure 2A:
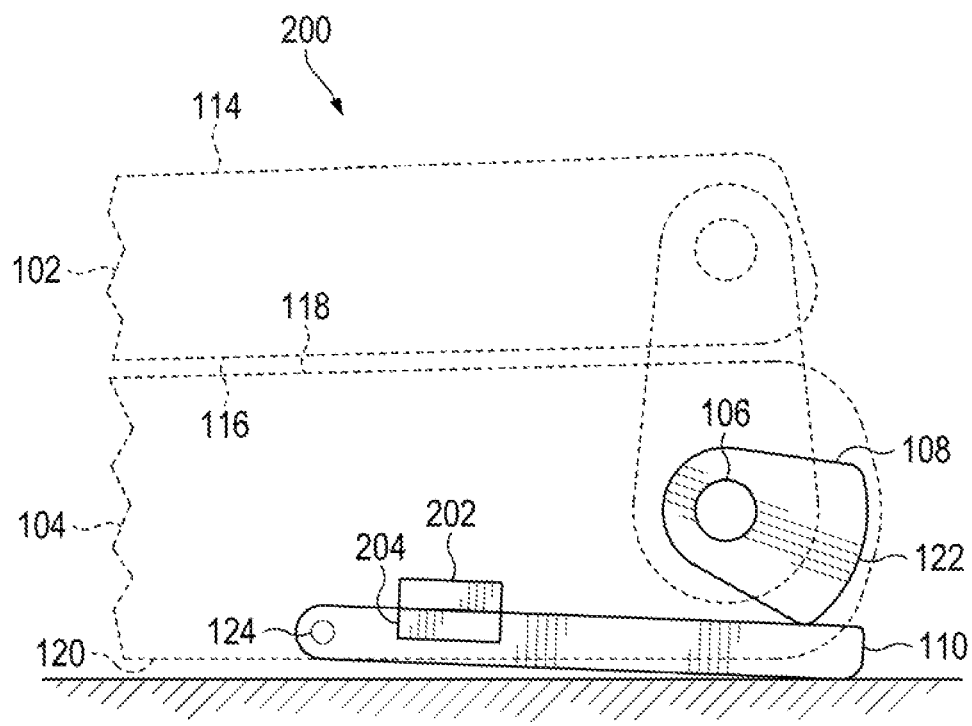
FIGS. 2A-B illustrate a computing device that includes the use of magnetic members for the retractable foot to maintain contact with a cam, according to an example.
Figure 2B:
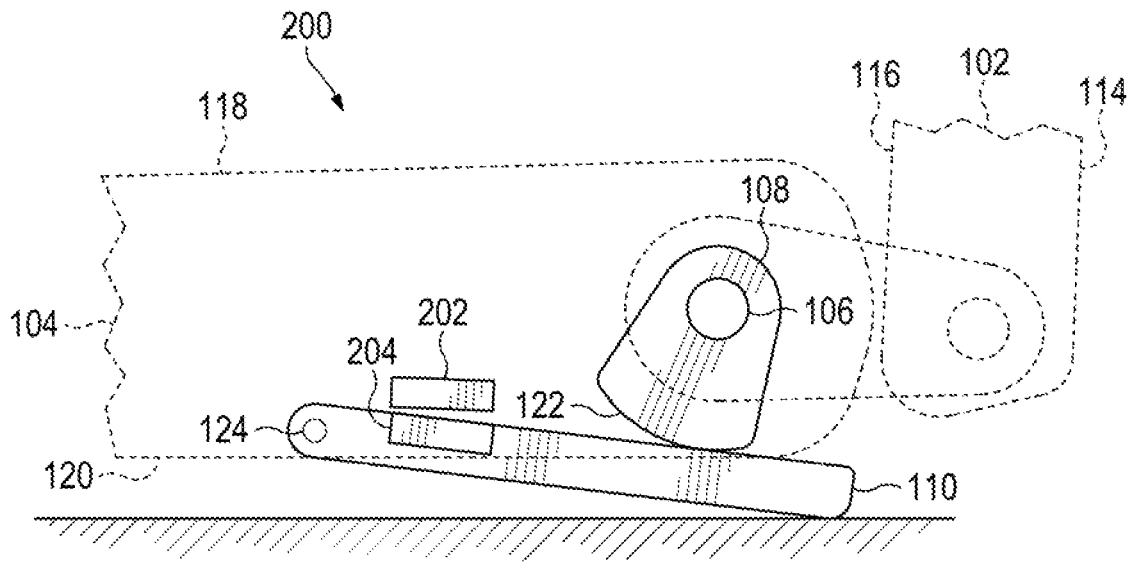

FIGS. 2A-B illustrate a computing device 200 that includes the use of magnetic members 202, 204 for the retractable foot 110 to maintain contact with the cam 108, according to an example. The magnetic member 202, disposed in the base member 104 includes ferrous and/or magnetic material that cooperates with ferrous and/or magnetic material of magnetic member 204 disposed in the retractable foot 110, to generate a magnetic attractive force. Referring to FIG. 2A, when the computing device 200 is in a closed position, and the curved portion 122 of the cam is not engaged with the retractable foot 110, the magnetic attractive force generated between the magnetic members 202, 204 allows the retractable foot 110 to remain retracted within the base member 104. However, in FIG. 2B, when the computing device 200 is operated in laptop mode, the curved portion 122 of the cam 108 makes contact with the retractable foot 110 and extends it out from the bottom surface 120 of the base member 104, overcoming the magnetic attractive force between magnetic members 202, 204.

When the curved portion 122 of the cam 108 no longer engages the retractable foot 110, for example, when the computing device 200 is back in a closed position or another operating position, such as tablet mode, the magnetic attractive force between magnetic members 202, 204 retracts the retractable foot 110 back into the bottom surface 120 of the base member 104. For example, although the cam 108 overcomes the magnetic attractive force between magnetic members 202, 204 when the curved portion 122 engages the retractable foot 110, the magnetic attractive force remains to retract the retractable foot 110 when the curved portion 122 of the cam 108 no longer engages the retractable foot 110. Although FIGS. 1A-B and 2A-B illustrate the use of springs 112 and magnetic members 202, 204, respectively, for ensuring contact of the retractable foot 110 with the cam 108, springs and magnetic members may be used in combination.

Figure 3A:
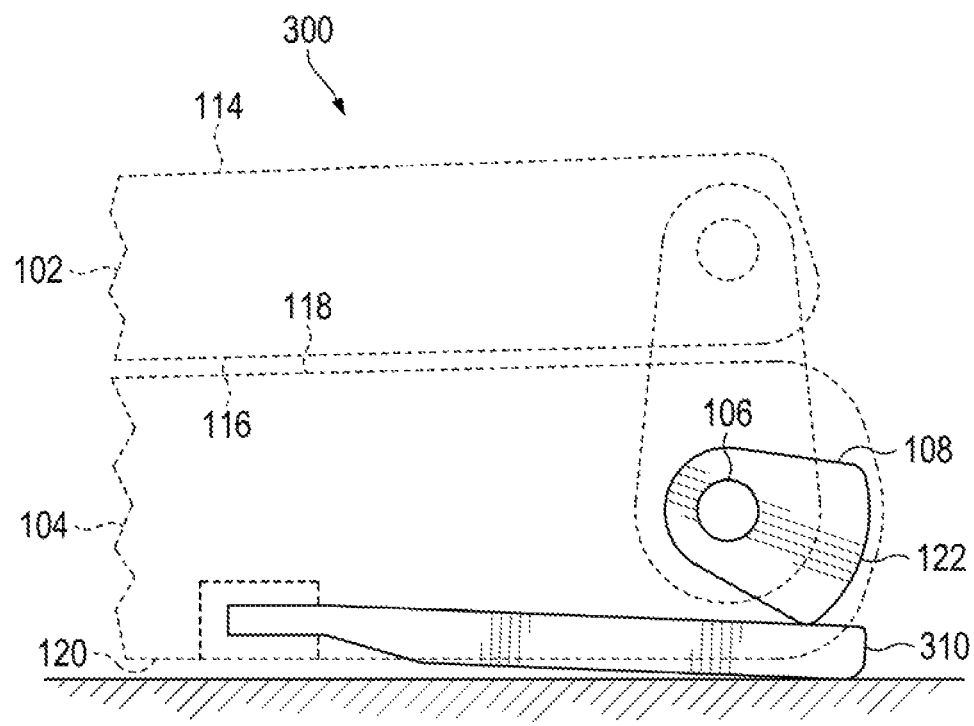
FIGS. 3A-B illustrate a computing device where the retractable foot is a flexible material, according to an example.
Figure 3B:
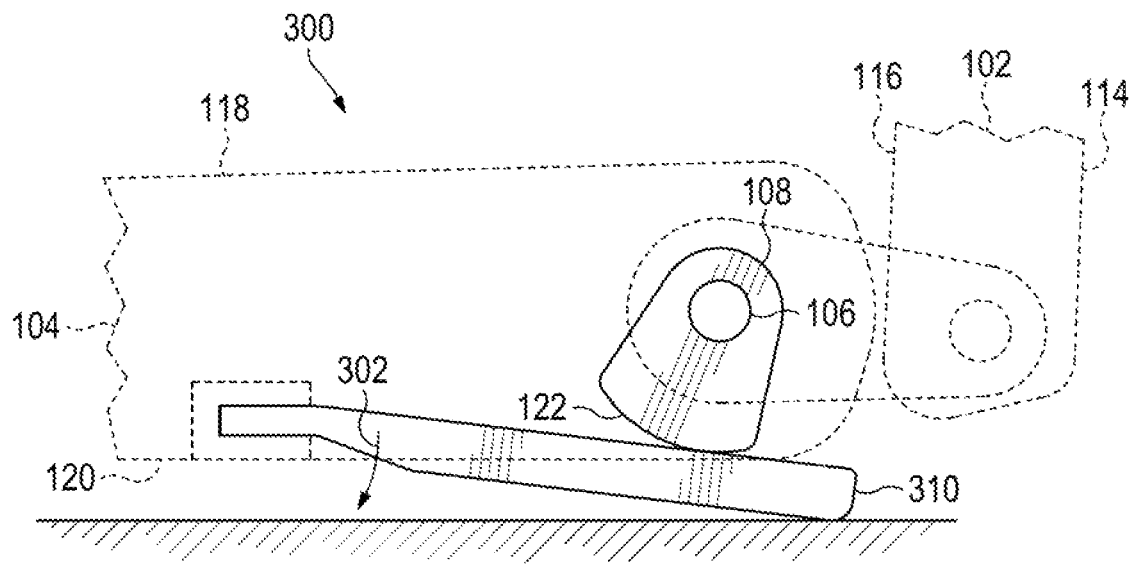

FIGS. 3A-B illustrate a computing device 300 where the retractable foot 310 is a flexible material, according to an example. Due to its flexible nature, the retractable foot 310 may store energy when it is engaged by the curved portion 122 of the cam 108. As an example, engagement by the curved portion 122 of the cam 108 bends the retractable foot 310 to extend from the bottom surface 120 of the base member, as illustrated in FIG. 3B (illustrated by arrow 302). This stored energy may return the retractable foot 310 back to its default state when the curved portion 122 of the cam 108 no longer engages the retractable foot 310. The default state may correspond to the retractable foot 310 retracted back in the base member 104, as illustrated in FIG. 3A. As an example, the flexible material of the retractable foot 310 may correspond to a flexible metal.

FIGS. 4A-E illustrate various operating positions of computing device 100, according to an example. As the display member 102 is rotated around the base member 104, for example, from the closed position illustrated in FIG. 4A to the tablet mode illustrated in FIG. 4E, the corresponding rotation of the cam 108 causes the curved portion 122 of the cam 108 to engage the retractable foot 110 in various operating positions, resulting in the extension of the retractable foot 110 from the bottom surface 120 of the base member 104. Although computing device 100 is illustrated, these operating conditions may apply to computing device 200 and computing device 300 as well.

Figure 4A:
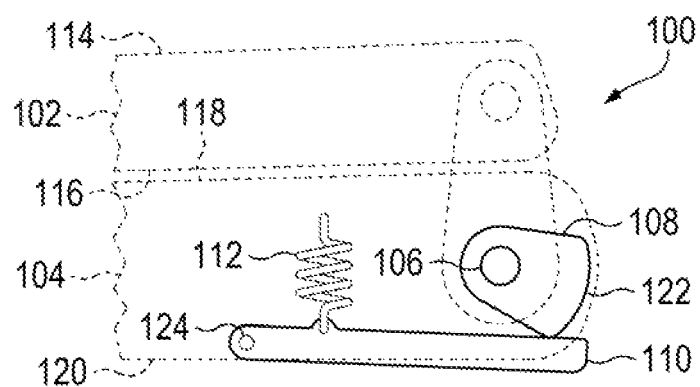
FIGS. 4A-E illustrate various operating positions of the computing device, according to an example.
Figure 4B:
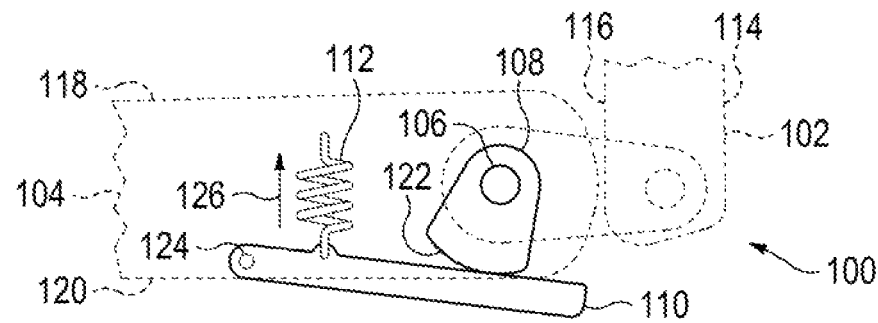

Referring to FIG. 4A, while the computing device 100 is in a closed position, the curved portion 122 of the cam 108 is directed away from the retractable foot 110, and the spring 112 keeps the retractable foot 110 retracted within the bottom surface 120 of the base member 104. Referring to FIG. 4B, when the computing device 100 is transitioned to laptop mode, rotation of the display member 102 causes a corresponding rotation of the cam 108, resulting in the curved portion 122 of the cam 108 engaging the retractable foot 110. This engagement causes the retractable foot 110 to extend from the bottom surface 120 of the base member 104, according to the geometry of the curved portion 122 of the cam 108. For example, the geometry of the curved portion 122 of the cam 108 may cause the retractable foot 110 to pivot out by 3 millimeters (mm).

Figure 4C:
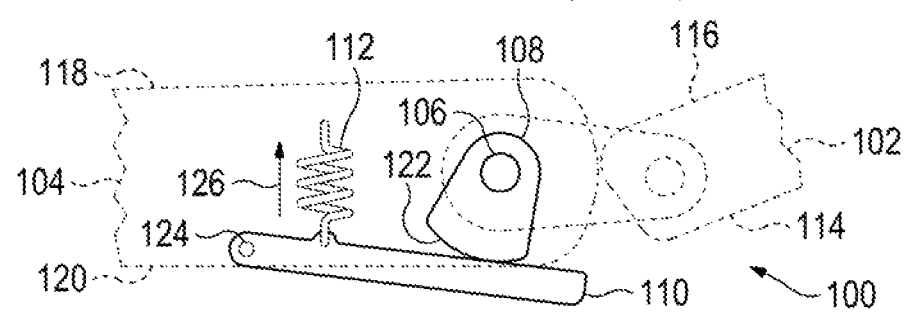
Figure 4D:
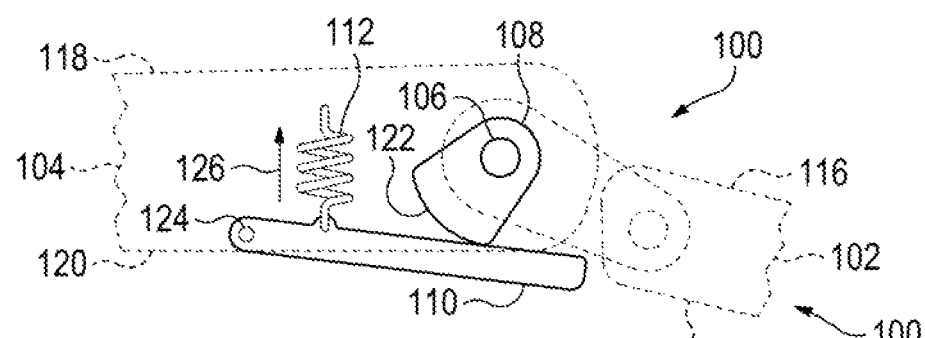

Referring to FIG. 4C, as the display member 102 is rotated open to a wider angle (e.g., 160 degrees), the retractable foot 110 remains extended. As an example, the displacement of the retractable foot 110 from the bottom surface 120 of the base member 104 depends on the geometry of the cam 108 that is in contact with the retractable foot 110. For example, the retractable foot 110 may remain pivoted out by 3 mm, similar to when the computing device 100 is in laptop mode, or by a different amount, based on the portion of the cam 108 that is in contact with the retractable foot 110. Referring to FIG. 4D, as the display member 102 is opened to 180 degrees, the corresponding rotation of the cam 108 causes the curved portion 122 of the cam 108 to move further along the retractable foot 110. As illustrated, the retractable foot 110 remains extended, as the curved portion 122 remains in contacts with the retractable foot 110. However, the geometry of the cam 108 determines the degree of how much the retractable foot 110 remains extended or retracted. Once the curved portion 122 is no longer in contact with the retractable foot 110, the spring 112 causes the retractable foot 110 to retract back within the bottom surface 120 of the base member 104.

Figure 4E:
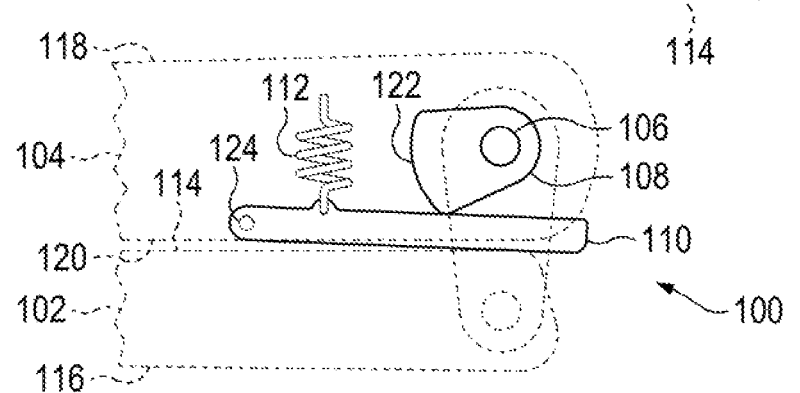

Referring to FIG. 4E, when the computing device 100 is transitioned to tablet mode, the curved portion 122 of the cam 108 remains directed away from the retractable foot 110, and the spring 112 keeps the retractable foot 110 retracted within the bottom surface 120 of the base member 104. While in tablet mode, the display member 102 and base member 104 end up being in a parallel orientation and collapsed against each other in an open, folded position. As an example, in this open, folded position, the bottom surface 120 of the base member 104 may be covered by the back surface 114 of the display member 102, as illustrated. With the retractable foot 110 retracted back within the bottom surface 120 of the base member 104, the display member 102 can be flush against the base member 104, improving the user experience while the computing device 100 is in tablet mode. As the computing device 100 is transitioned from the tablet mode back to one of the operating positions illustrated, for example, laptop mode illustrated in FIG. 4B, the corresponding rotation of the cam 108 may cause the curved portion 122 of the cam 108 to engage the retractable foot 100 again, and pivot out.

It should be understood that examples described herein below may include various components and features. It should also be understood that, in the following description, numerous specific details are set forth to provide a thorough understanding of the examples. However, it should be understood that the examples may be practiced without limitations to these specific details. In some instances, well known methods and structures may not be described in detail to avoid unnecessarily obscuring the description of the examples. Also, the examples may be used in combination with each other.

Reference in the specification to "an example" or similar language means that a particular feature, structure, or characteristic described in connection with the example is included in at least one example, but not necessarily in other examples. The various instances of the phrase "in one example" or similar phrases in various places in the specification are not necessarily all referring to the same example.

It should be understood that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. A computing device comprising:
a display member;
a base member rotatably connected to the display member via a hinge, wherein the base member comprises a retractable foot to extend from a bottom surface of the base member; and
a cam sharing an axis with the hinge, wherein when the display member is to be rotated, a corresponding rotation of the cam is to control extension and retraction of the retractable foot.

2. The computing device of claim 1, wherein the retractable foot is a flexible metal that maintains contact with the cam and extends from or retracts into the bottom surface of the base member, based on the rotation of the cam when the display member is to be rotated with respect to the base member.

3. The computing device of claim 1, comprising a mechanism for the retractable foot to maintain contact with the cam, wherein examples of the mechanism comprise a spring and a magnetic member.

4. The computing device of claim 1, wherein the retractable foot pivots in and out from the bottom surface of the base member from an end of the retractable foot.

5. A computing device comprising:
a display member;
a base member rotatably connected to the display member via a hinge, wherein the base member comprises a retractable foot to extend from a bottom surface of the base member;
a cam sharing an axis with the hinge, wherein when the display member is to be rotated, a corresponding rotation of the cam is to control extension and retraction of the retractable foot; and
a mechanism for the retractable foot to maintain contact with the cam.

6. The computing device of claim 5, wherein examples of the mechanism comprise a spring and a magnetic member.

7. The computing device of claim 5, wherein the retractable foot pivots in and out from the bottom surface of the base member from an end of the retractable foot.

8. The computing device of claim 5, wherein the retractable foot is a flexible metal that maintains contact with the cam and extends from or retracts into the bottom surface of the base member, based on the rotation of the cam when the display member is to be rotated with respect to the base member.

9. A base member for a computing device comprising:
a hinge to rotatably couple the base member with a display member;
a retractable foot; and
a cam to rotate with the hinge to extend the retractable foot from the base member upon the display member being rotated from a closed position to a first operation position, wherein the retractable foot is to retract back into a bottom surface of the base member when the display member is to be rotated further open from the first operating position to a second operating position.

10. The base member of claim 9, wherein the second operating position comprises a back surface of the display member making contact with the bottom surface of the base member.

11. The base member of claim 9, wherein the retractable foot is a flexible metal that maintains contact with the cam and extends from or retracts into a bottom surface of the base member, based on the rotation of the cam when the display member is to be rotated with respect to the base member.

12. The base member of claim 9, comprising a mechanism for the retractable foot to maintain contact with the cam, wherein examples of the mechanism comprise a spring and a magnetic member.

13. The base member of claim 9, wherein the retractable foot pivots in and out from the bottom surface of the base member from an end of the retractable foot.

* * * * *